United States Patent
Starr et al.

(10) Patent No.: US 8,757,572 B1
(45) Date of Patent: Jun. 24, 2014

(54) CUPHOLDER ADAPTER

(75) Inventors: Judd E. Starr, Sparks, NV (US); Joseph L Gauntt, Reno, NV (US); Robert Lee Biddlecome, Carson City, NV (US)

(73) Assignee: Judd E. Starr, Woodland Hills, CA (US)

( * ) Notice: Subject to any disclaimer, the term of this patent is extended or adjusted under 35 U.S.C. 154(b) by 194 days.

(21) Appl. No.: 13/249,695

(22) Filed: Sep. 30, 2011

Related U.S. Application Data

(60) Provisional application No. 61/391,744, filed on Oct. 11, 2010.

(51) Int. Cl.
*B60N 3/10* (2006.01)

(52) U.S. Cl.
USPC .... 248/311.2; 248/314; 224/556; 297/188.14

(58) Field of Classification Search
CPC ............. B60N 3/10; B60N 3/12; A47G 23/02
USPC ............ 248/220.22, 311.2, 313, 314, 292.12, 248/292.13, 346.06, 349.1; 220/737; 224/926, 545, 550, 556, 542; 297/188.14
See application file for complete search history.

(56) References Cited

U.S. PATENT DOCUMENTS

| | | | | |
|---|---|---|---|---|
| 1,168,265 | A | * | 1/1916 | Kratz ........................... 248/145.6 |
| 1,495,991 | A | * | 6/1924 | Drynan ........................... 248/172 |
| 1,912,287 | A | * | 5/1933 | Lundell ....................... 248/285.1 |
| 3,891,171 | A | * | 6/1975 | Samuelian et al. ............ 248/131 |
| 4,792,184 | A | * | 12/1988 | Lindberg et al. ......... 297/188.16 |
| 5,560,578 | A | * | 10/1996 | Schenken et al. ............. 248/313 |
| 6,062,518 | A | * | 5/2000 | Etue .......................... 248/231.21 |
| 6,113,049 | A | * | 9/2000 | Miljanich .................. 248/311.2 |
| 6,267,340 | B1 | * | 7/2001 | Wang ....................... 248/231.21 |
| 6,732,990 | B2 | * | 5/2004 | Hudson ....................... 248/311.2 |
| 6,843,397 | B2 | * | 1/2005 | Then et al. ..................... 224/552 |
| 7,497,409 | B2 | * | 3/2009 | Lawlor ....................... 248/311.2 |
| 7,611,114 | B1 | * | 11/2009 | Griffin ....................... 248/311.2 |
| 7,819,728 | B2 | * | 10/2010 | Beckley ......................... 454/155 |
| 8,205,767 | B2 | * | 6/2012 | Lawlor et al. .................. 220/737 |
| 8,430,140 | B2 | * | 4/2013 | Ognjanovski et al. ........ 141/350 |
| 2009/0261221 | A1 | | 10/2009 | Kali |
| 2010/0176139 | A1 | | 7/2010 | Nargi |

FOREIGN PATENT DOCUMENTS

GB    WO2008/007053    *    1/2008

* cited by examiner

*Primary Examiner* — Terrell McKinnon
*Assistant Examiner* — Eret McNichols
(74) *Attorney, Agent, or Firm* — Watson Rounds; Marc D. Foodman

(57) ABSTRACT

An apparatus for adapting a cup holder to securely hold a variety of objects that may be of different configurations, sizes and shapes. The apparatus comprises a lower portion with extending members for positioning the base of the apparatus within the opening of a cup holder or other open space. An upper portion is adapted to securely hold objects including but not limited to stemware such as wine glasses, an ash tray, coffee mugs, other oversized or small beverage containers, a portable lamp, a portable music player such as an iPod or other MP3 player, a portable computing device including but not limited to an iPhone or other smart phone, an iPad or other tablet computer, a laptop computer, a Kindle or other electronic reader, as well as any other item which a user would like to hold securely and usually within arm's reach of a seating position.

24 Claims, 20 Drawing Sheets

CUPHOLDER ADAPTER

RELATED UNITED STATES APPLICATION DATA

This application claims priority benefit from U.S. Provisional Application No. 61/391,744, filed on Oct. 11, 2010

BACKGROUND

Cup holders have become omnipresent in vehicles of all types and have more recently begun to find their way into other places where people feel the urge to keep a drink close at hand. For example, couches, chairs, strollers, movie theater and stadium seats, and other furniture now typically include one or more cup holders to allow a user to place a beverage within easy reach without having to worry about inadvertent spills. It seems that cup holders are a convenience we can no longer do without.

A problem with cup holders is that they are usually of a fixed size. If you want to use them to hold a cup or other container that doesn't fit snugly in the cup holder, it tends to move around and spill its contents. Also, it's not unusual to find that a tall water bottle or other container that you like to carry with you doesn't fit in the cup holder at all. An example is a coffee mug or other cup with a handle. In other cases, the cup holder is too shallow and the container is easily knocked out of the cup holder and onto the floor, the seat of the person who placed it there, or worse yet, onto another person in close proximity to the cup holder. Or, it falls out when a vehicle turns a corner, hits a bump, or makes other sudden moves.

The users of cup holders are frequently frustrated by these shortcomings. In some cases, cup holder sleeves have been developed that make the cup holder smaller. In other cases, particularly in high end airplanes and boats, the user may remove a cup holder insert from a panel into which the cup holder is cut and try to enlarge it to accommodate a bigger container. This may result in damage to expensive wood or other materials surrounding the cup holder insert. Repairs may involve replacement of the materials as well as the time and labor of skilled craftsman. The cup holder adapter of the present invention overcomes these problems and may be used in a great variety of cup holders having a host of different shapes, widths and depths.

SPECIFICATIONS

Detailed Description

Figure 1:
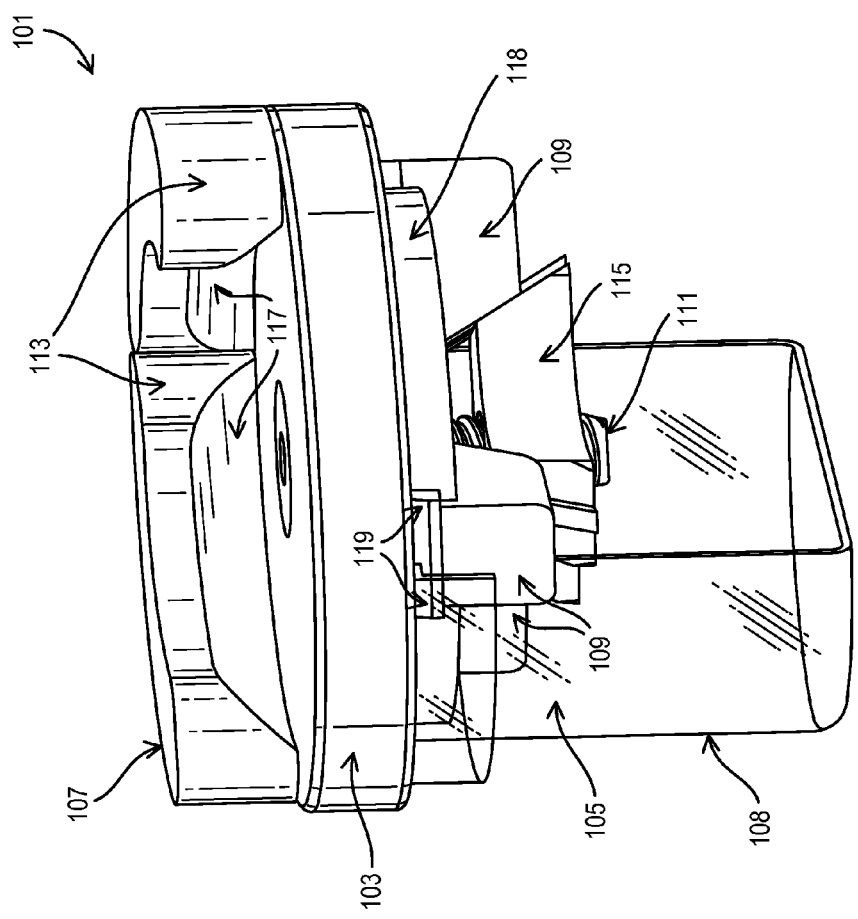
FIG. 1 is a perspective view of a first embodiment of a cup holder adapter.

The present invention will now be described more fully with reference to the accompanying drawings. It should be understood that the invention may be embodied in many different forms and should not be construed as limited to the embodiments set forth herein. Throughout FIGS. 1-20, like elements of the invention are referred to by the same reference numerals for consistency purposes.

FIG. 1 is a perspective view of cup holder adapter 101. It includes a flat, circular shaped base 103 to which a housing 105 is attached on one side and an adapter 107 is attached to the other side. Housing 105 is configured to be inserted into the opening of a cup holder 108, shown in transparent view below base 103. Housing 105 includes three semi-circular raised sections 118 and a pressure boss 115 that are centered on an axis through the center of base 103. Adjustable binding posts 109 are positioned between semi-circular raised sections 118 and slide in tracks 119 in response to the turning of adjustment screw 111 and pressure exerted by pressure boss 115. A nut (not shown) into which the end of screw 111 is screwed on the bottom side of pressure boss 115 may be used to hold pressure boss 115 in place in housing 105 and may be recessed into pressure boss 115. The nut provides a stopping point and prevents binding posts 109 from popping out when binding posts 109 are retracted. While the embodiment in the figures shows a configuration with three binding posts 109, it should be understood that the invention could be implemented in alternative design formats using fewer than three or more than three binding posts 109.

Adapter 107 is affixed to the top side of base 103. Adapter 107 may be in any of a number of different configurations to accommodate different objects or devices. In the embodiment of FIG. 1, adapter 107 is a holder for stemware 401 (see FIG. 4) that uses two arcuate arms 113 with beveled relief recesses 117 to hold the base of the stemware firmly in place against each other and the top of base 103. Other holder type accessories may also be formed with a base that fits within and is held in place by arcuate arms 113.

Figure 2:
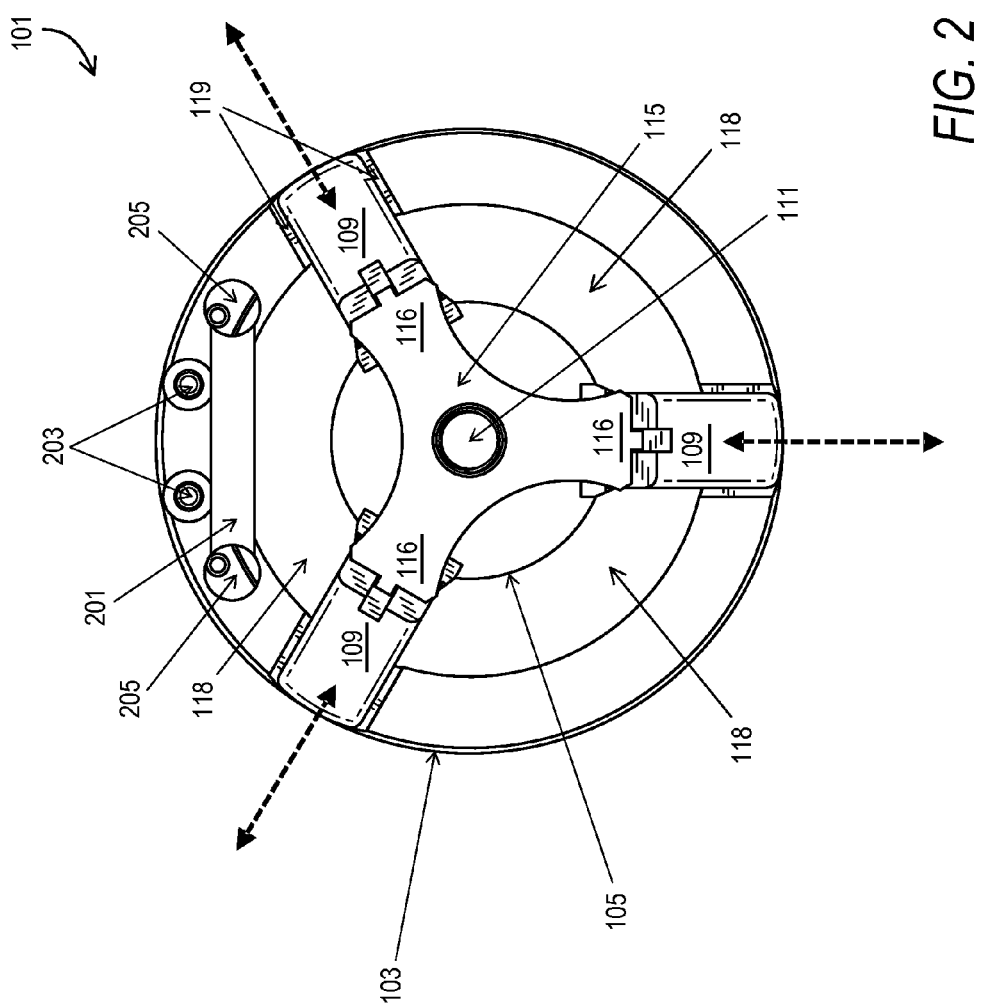
FIG. 2 is a bottom view of a first embodiment of a cup holder adapter.

FIG. 2 is a bottom view of cup holder adapter 101. In this embodiment, pressure boss 115 has three pressure points 116 that are aligned with each of three adjustable binding posts 109. Arcuate arms 113 (see FIG. 1) are attached to base 103 by mounting screws 305 (see FIG. 3) that are positioned through screw holes 203 and that screw into the bottom of one end of arcuate arm 113. A spring recess 201 houses a spring 303 (see FIG. 3) that attaches at either end to dowel pins 301 (see FIG. 3) that fit through dowel pin holes 205 and bias arcuate arms 113 to a closed position around the periphery of base 103.

Figure 3:
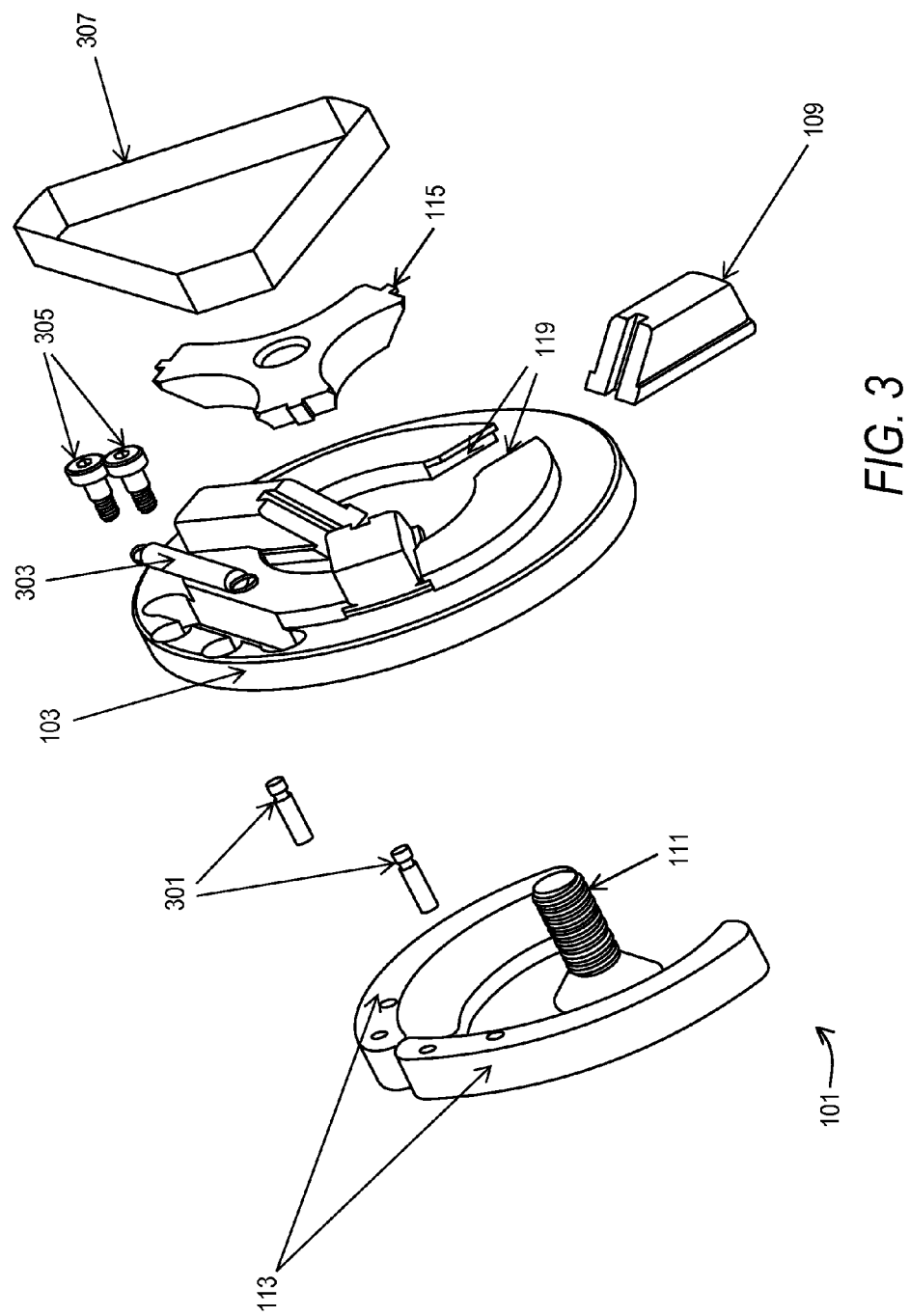
FIG. 3 is a perspective exploded view of the components of a first embodiment of a cup holder adapter.

FIG. 3 is an exploded perspective view showing the individual components of cup holder adapter 101 in relative position to each other. A rubber band 307 fits around the outer edges of binding elements 109 and forms a non-slip surface for contacting the inner surface of the cup holder. Rubber band 307 also biases binding posts 109 inwardly so that when adjustment screw 111 is turned to relieve pressure by pressure boss 115 on binding posts 109, binding posts 109 slide inwardly toward the center of base 103 in tracks 119. Another purpose of rubber band 307 is to provide a soft non-abrasive surface so that binding elements 109 do not scratch or otherwise damage the inside walls of the cup holder.

Figure 4:
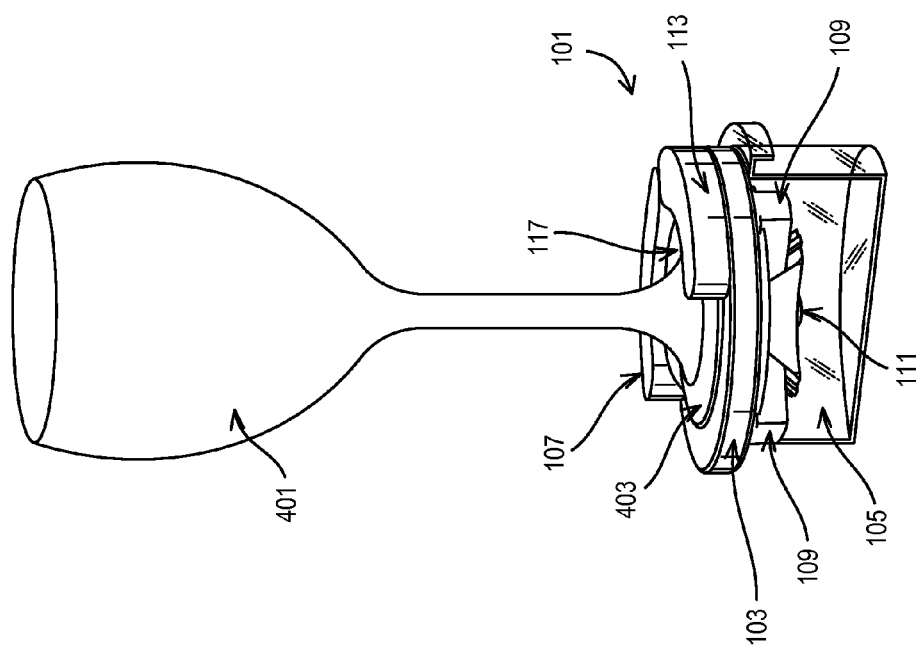
FIG. 4 is a perspective view of a first embodiment of a cup holder adapter holding a piece of stemware.

FIG. 4 is a perspective view of cup holder adapter 101 holding a piece of stemware 401. In this embodiment, a base 403 of stemware 401 is pressed into beveled relief recesses 117 of arcuate arms 113. Arcuate arms are pushed outwardly beyond the periphery of base 103 but press back against stemware base 403 to hold stemware 401 in place against the top of cup holder adapter base 103 as a result of pressure applied by spring 303.

Figure 5:
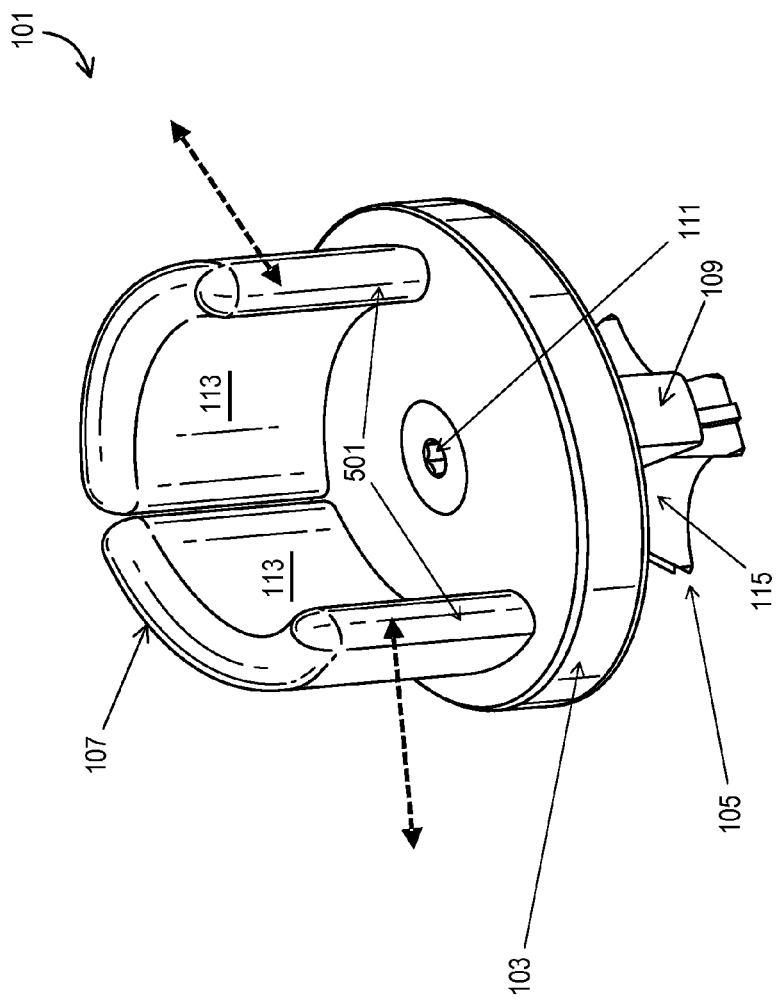
FIG. 5 is a perspective top view of a first embodiment of a cup holder adapter with an alternative embodiment for gripping a container.

FIG. 5 is an alternative embodiment of cup holder adapter 101. In this embodiment, arcuate arms 113 are taller and may or may not include beveled relief recesses. The tall arcuate arms 113 shown in FIG. 5 are biased towards each other by spring 303 in the same manner as described with respect to the arcuate arms of FIG. 4. The tall arcuate arms 113 are useful for securely holding a tall glass, water bottle or even a coffee mug with a handle where the handle is positioned in the open space between the ends 501 of tall arcuate arms 113. The mug or other container may be slid into place through the opening formed between the ends 501 of tall arcuate arms 113. Arms 113 may extend outward as indicated by the direction arrows and then move back into place when the container is positioned within the 113.

Figure 6:
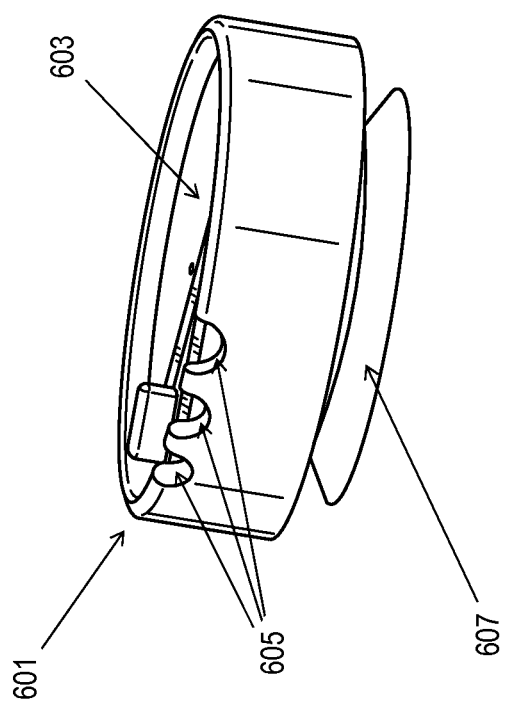
FIG. 6 is a perspective view of an ashtray to be engaged by a cup holder adapter.
Figure 7:
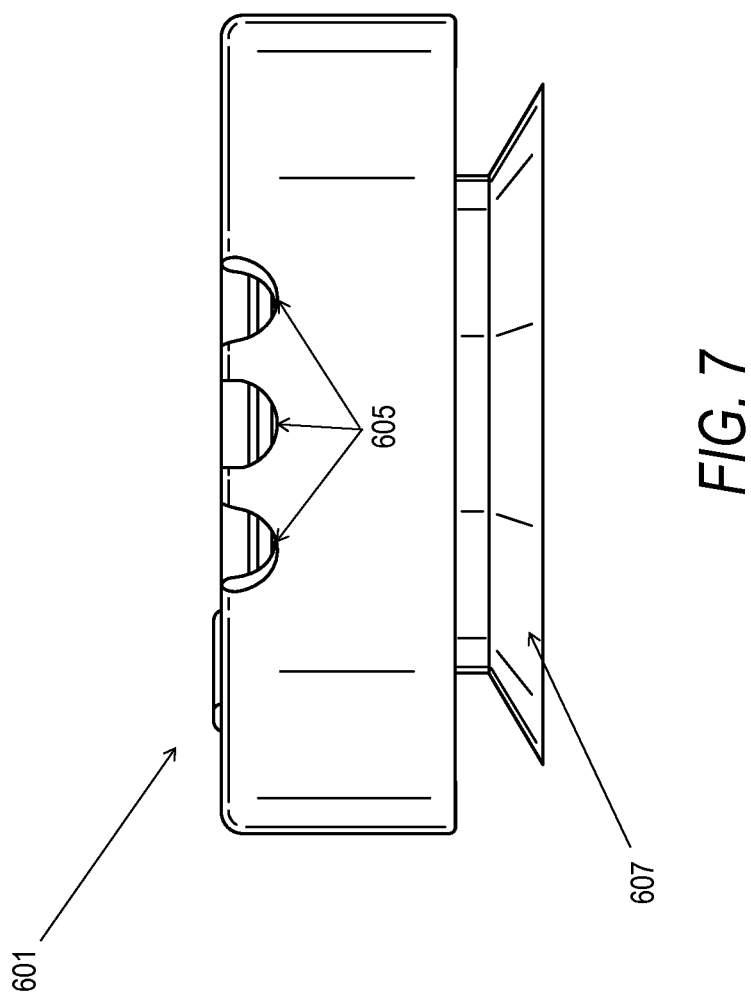
FIG. 7 is a side view of an ashtray to be engaged by a cup holder adapter.
Figure 8:
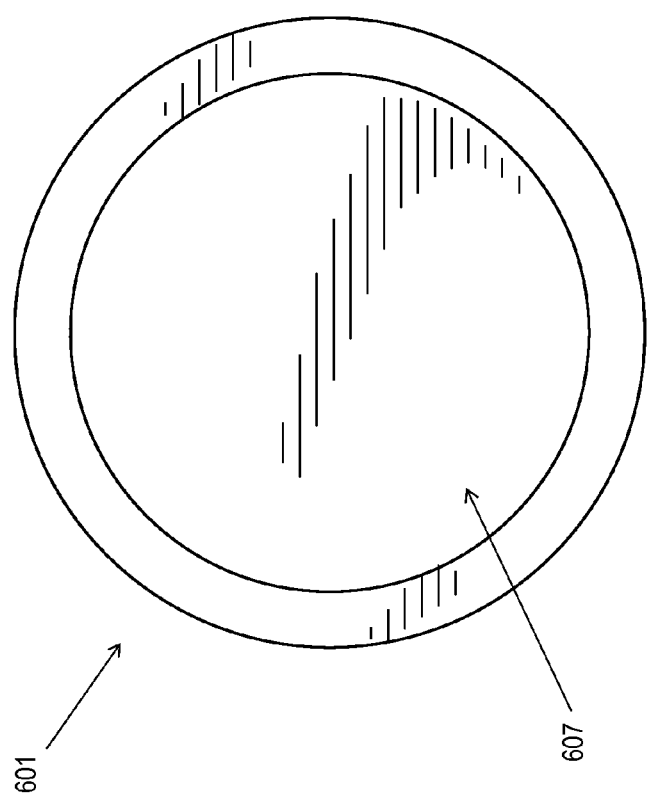
FIG. 8 is a bottom view of an ashtray to be engaged by a cup holder adapter

FIGS. 6-8 depict different views of an ashtray 601 for use with cup holder adapter 101. Ashtray 601 is formed with a lid 603, cigarette holders 605 and ashtray base 607. Base 607 is formed to fit within beveled relief recesses 117 of arcuate arms 113. Alternatively, a semi-circular fixed engagement track (not shown) may be substituted on the topside of base 103 for arcuate arms 113 to engage ashtray base 607 and hold ashtray 601 in place. A fixed semi-circular engagement track may also be used to engage other frames of various configurations for holding objects of all different shapes and sizes, as well as more than one such object at the same time.

Figure 9:
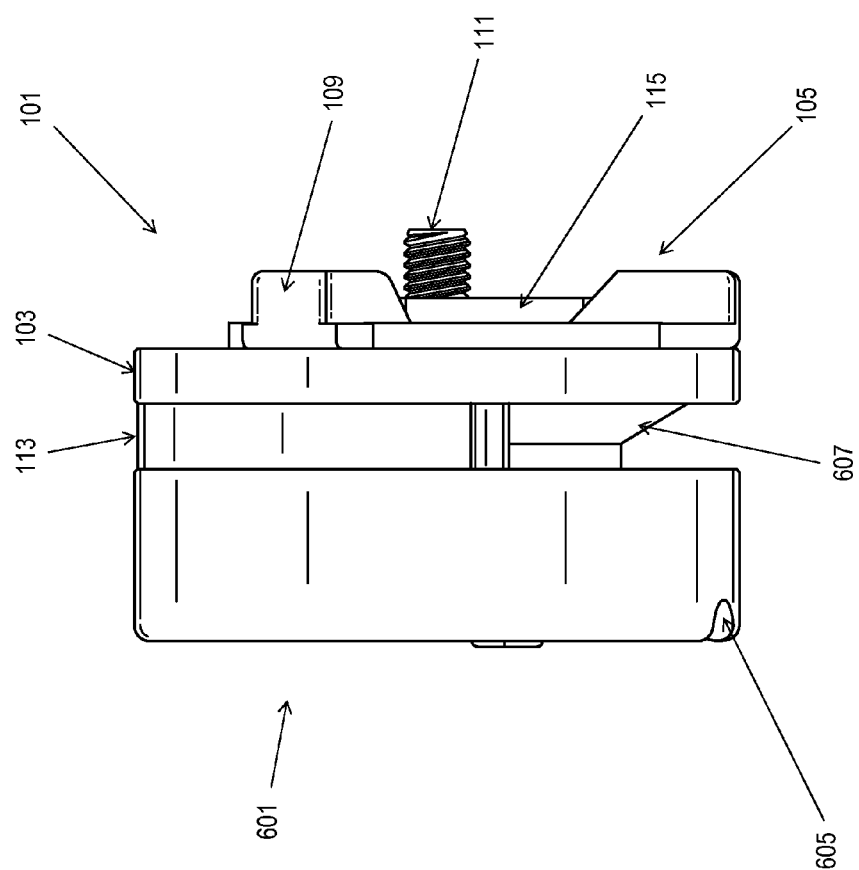
FIG. 9 is a perspective side view of a first embodiment of a cup holder adapter engaging an ashtray attachment.
Figure 10:
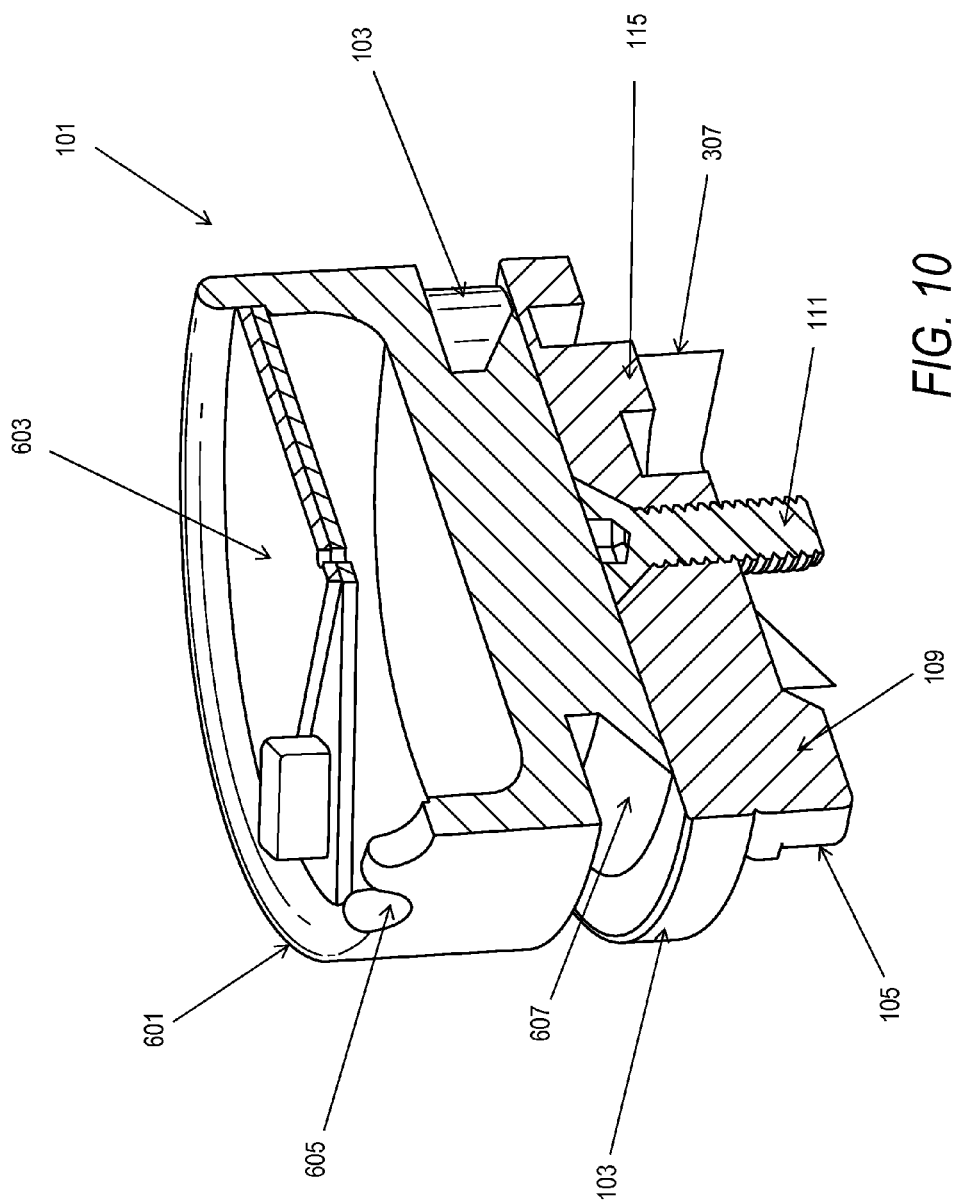
FIG. 10 is perspective cut-away view of a first embodiment of a cup holder adapter engaging an ash tray attachment.

FIGS. 9-10 show ashtray 601 engaged for use in cup holder adapter 101. Ashtray base 607 is shown in engaged in position against the top of cup holder adapter base 103 with housing 105 affixed to the bottom of base 103. Arcuate arms 113 grip ashtray base 607 and hold ashtray 601 firmly in place.

Figure 11:
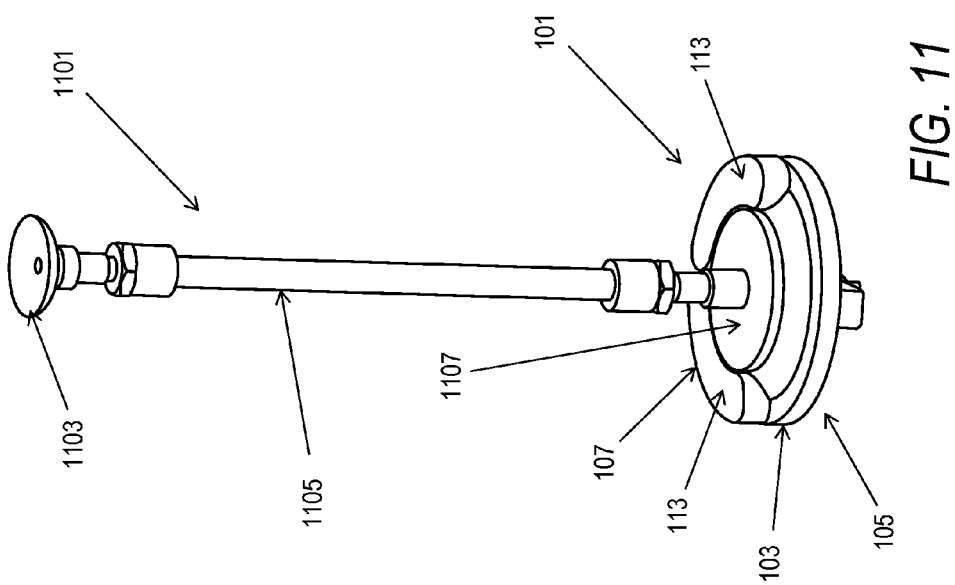
FIG. 11 is a perspective view of a first embodiment of a cup holder adapter engaging a suction cup type apparatus for holding an object.

FIG. 11 is a perspective view of a cup holder adapter 101 with a frame 1101 for holding an object (not shown). The frame 1101 is fitted at one end with a suction cup 1103. Suction cup 1103 is supported by a rod 1105 with an end base 1107 that is held in place by arcuate arms 113 and fits within beveled relief recesses 117. It should be recognized that rod 1105 may be rigid or made of a semi-flexible material so that it can be bent into a preferred shape allowing the object being held to be positioned as desired by a user. Examples of items that can be held include but are not limited to: reading lights or lamps; music players; computing devices such as tablets or laptops; cellular phones, smart phones or other phones; vases; and/or electronic readers.

Operation of this embodiment will now be described with reference to FIGS. 1-11. Cup holder adapter 101 starts out with binding posts 109 in a retracted position inside the periphery of base 103. Cup holder adapter 101 is placed into cup holder 108 with housing 105 inside the cup holder space below the rim of cup holder 108. The top of base 103 may be flush with the top of cup holder 108 or positioned above the rim of the cup holder 108. In either case, cup holder adapter 101 is then in position to be secured within cup holder 108. As the user tightens adjustment screw 111 through the top of base 103, adjustment screw 111 pulls up on pressure boss 115 applying force to binding posts 109 along the outside inclined edges 116 of pressure boss 115. The pressure applied by pressure boss 115 causes a corresponding inclined edge on the inside edges of binding posts 109 to slide outwardly and away from the center of base 103 stretching rubber band 307 until the outside edge of binding posts 109 meet the inside surface of cup holder 108. Rubber band 307 positioned between the outside surface of binding posts 109 and the inside surface of cup holder 108 adds a non-slip surface for better grip to keep cup holder adapter 101 in place and to protect the inside surface of cup holder 108. Once binding posts 109 are tightened into position within cup holder 108, cup holder adapter 101 is secure and ready to use for holding an object.

The operation of expanding and retracting binding posts 109 of cup holder adapter 101 enables cup holder adapter 101 to be used in a great variety of cup holders having a host of different shapes, opening sizes and depths.

An example of a particular use for cup holder adapter 101 is to hold a piece of stemware 401. Stemware 401 is grasped by a user by either the bowl of the glass or the stem. With stemware base 403 placed flat onto cup holder base 103, the user slides stemware 401 into arcuate arms 113 within beveled relief recesses 117. If base 403 is wider than the opening 501 between arms 113, arms 113 extend outwardly from the periphery of base 103 against tension applied to arms 113 by spring 303. The same basic operation applies for a water bottle, coffee mug or other object that fits within tall arcuate arms 113 (as tall arcuate arms 113 move away from the base in line with the arrows shown in FIG. 5).

Removal of stemware 401 from adapter 107 is accomplished by pulling stemware 401 back and out of its position within arcuate arms 113. As stemware 401 is pulled out, arcuate arms 113 close due the biasing force exerted by spring 303 and arcuate arms 113 come back into a rest position around the periphery of base 103.

To remove cup holder adapter 101 from cup holder 108, adjustment screw 111 is loosened. The loosening action causes pressure boss 115 to move in a downward direction away from base 103. This, in turn, causes binding posts 109 to slide inwardly towards the center of base 103. As pressure boss 115 moves down, pressure boss 115 slides down along its outside inclined surface 116 in contact with the corresponding inside inclined surface of binding posts 109. At the same time binding posts 109 slide inwardly towards the center of base 103 within tracks 119 as a result of the force exerted by rubber band 303 that is wrapped around the outside of each binding post 109. Once adjustment screw 111 has been loosened enough for binding posts 109 to be retracted away from the inner surface of cup holder 108, cup holder adapter 101 may be removed from its position within cup holder 108.

Figure 12:
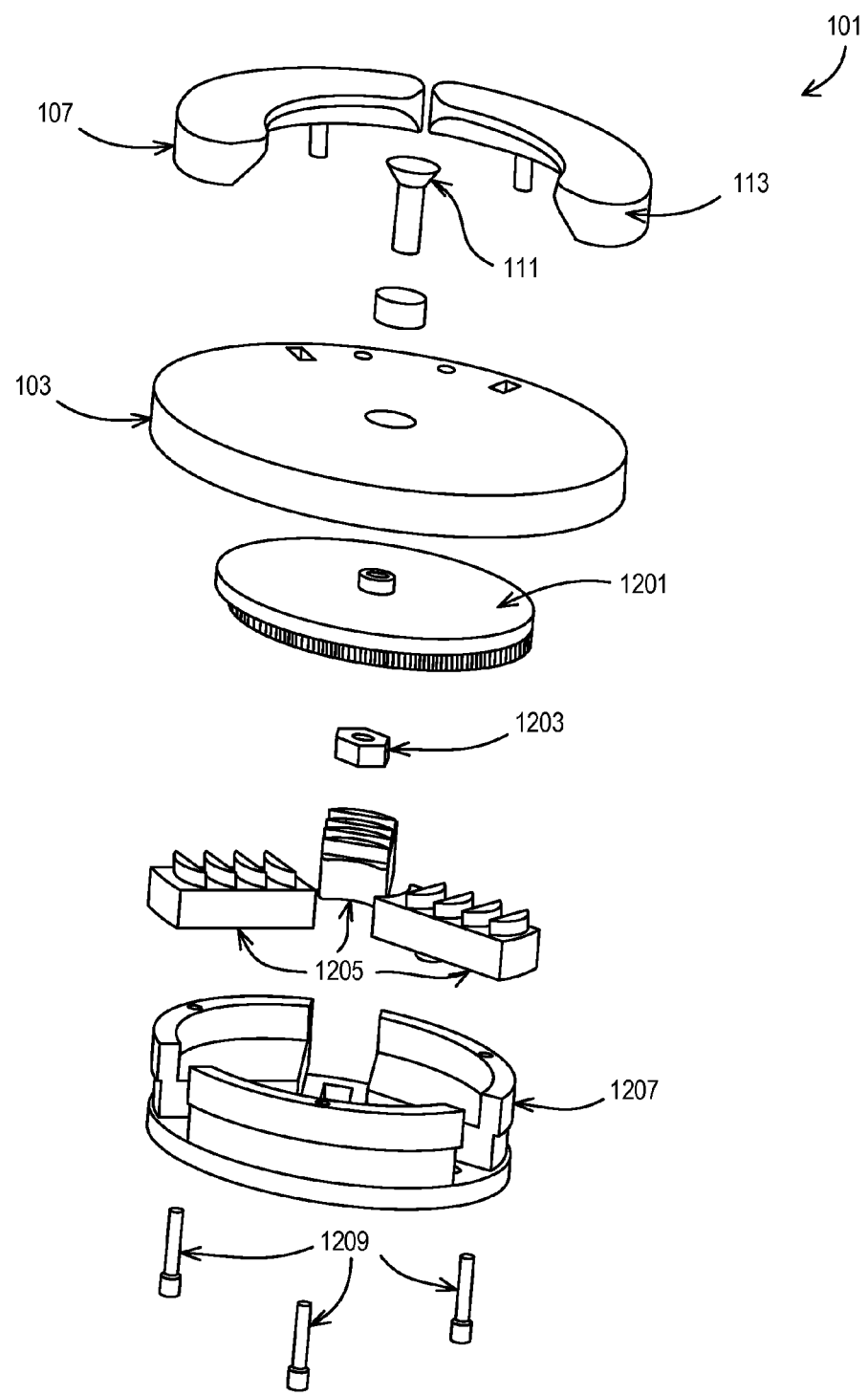
FIG. 12 is a perspective exploded view of the components of an alternative embodiment of a cup holder adapter.

FIG. 12 is a perspective exploded view of the components of an alternative embodiment of a cup holder adapter. In this embodiment, base 103 and the other components for holding a cup or other item are the same as that described with respect to the first embodiment above. In this alternative embodiment, a scroll plate 1201 is affixed to the bottom of base 103 by securing nut 1203. Scroll plate 1201 works in conjunction with extending members 1205 to hold cup holder adapter in place within a cup holder. Three extension members 1205 are shown but a larger or smaller number of extension members could be employed. Bottom cover 1207 which is cylindrically shaped with a hollow interior fits over extension members 1205 to hold extension members 1205 securely in place during operation of cup holder adapter 101. Bottom cover securing screws 1209 affix bottom cover 1207 securely to scroll plate 1201.

Figure 13:
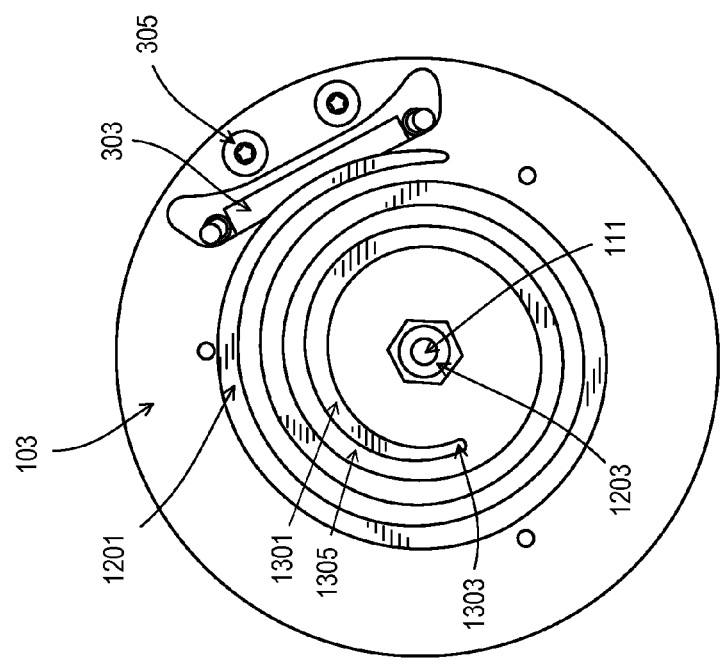
FIG. 13 is a top down view of a scroll plate of an alternative embodiment of a cup holder adapter.

FIG. 13 is a top down view of scroll plate 1201. As can be seen in FIG. 13, scroll plate 1201 has a defined ridge 1301 that scrolls circumferentially outwardly from its starting point 1303 creating a channel 1305 between portions of defined ridge 1301. Securing nut 1203 and screw 111 hold scroll plate 1201 securely to base 103 and allow scroll plate 1201 to turn for tightening and loosening within bottom cover 1207.

Figure 14B:
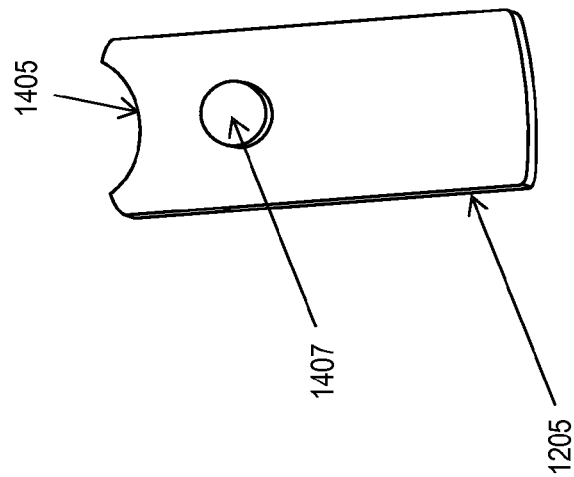
FIGS. 14A and 14B are views of an extending member for use in an alternative embodiment of a cup holder adapter.
Figure 14A:
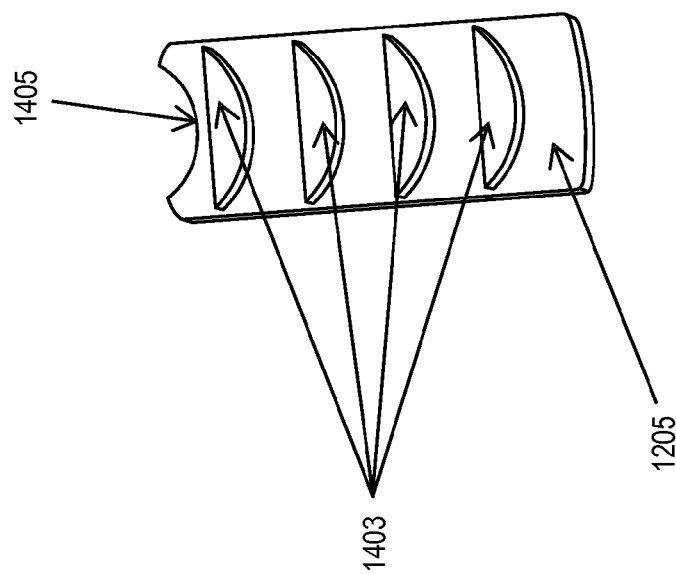

FIG. 14A is a top down view of one side of an extending member 1205 that works in conjunction with scroll plate 1201. Each extending member 1205 includes a set of protrusions 1403 on side formed to fit within channel 1305 of scroll plate 1201. Notched end 1405 of extending member 1205 allows each extending member 1205 to fit snugly against other extending members when lined up together on scroll plate 1201. FIG. 14B shows the other side of extending member 1205. A rounded protrusion 1407 is formed on extending member 1205.

Figure 15:
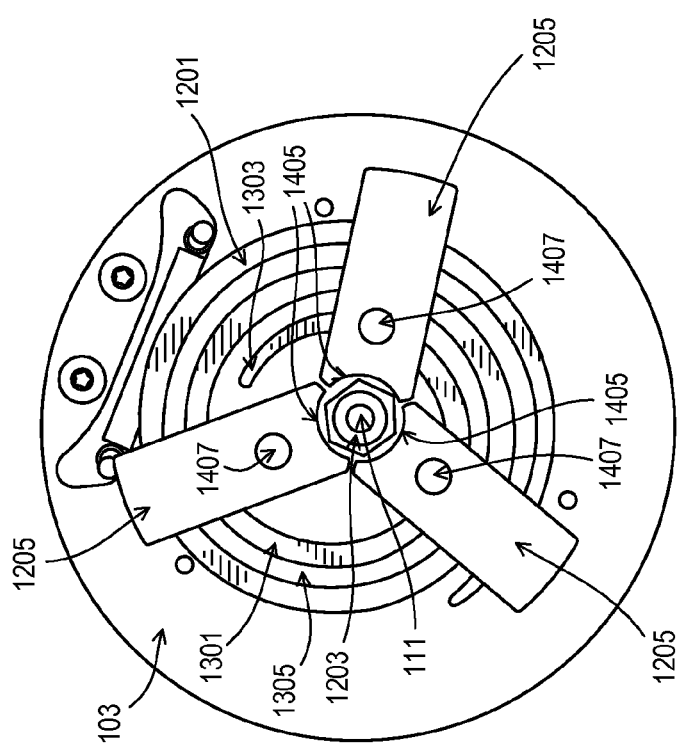
FIG. 15 is a top down view of a scroll plate with extending members in an unextended position.

FIG. 15 is a top down view of scroll plate 1201 with extending members 1205 in a retracted position. Notched ends of extending members 1405 fit together around securing nut 1203 at the center of scroll plate 1201.

Figure 16:
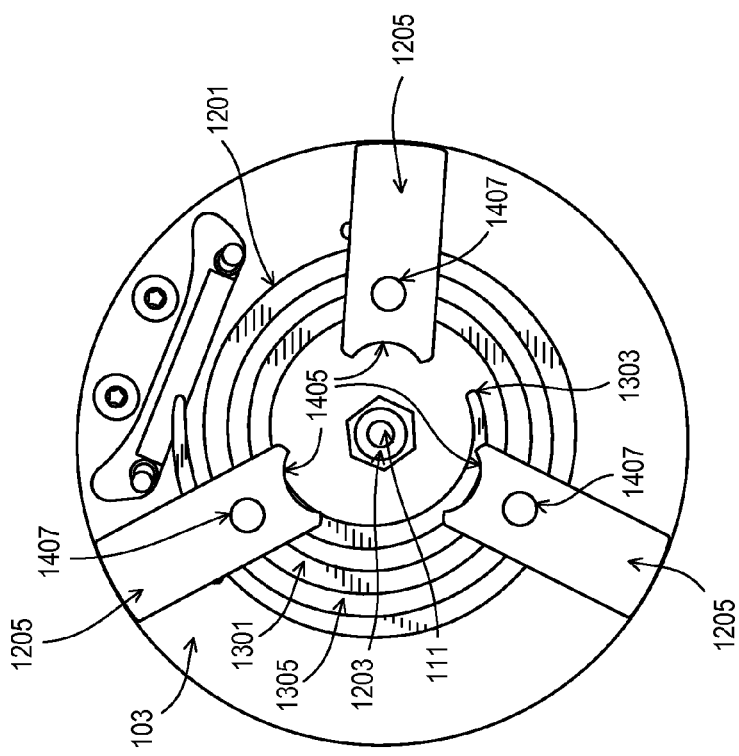
FIG. 16 is a top down view of a scroll plate with extending members in an extended position.

FIG. 16 is a top down view of a scroll plate 1201 with extending members 1205 in an extended position after scrolling plate 1201 has been rotated causing extending members 1205 to transition circumferentially outwardly as protrusions 1403 (not visible) on the opposing side of extending members 1205 travel within channel 1305 as scrolling plate 1201 turns.

Figure 17:
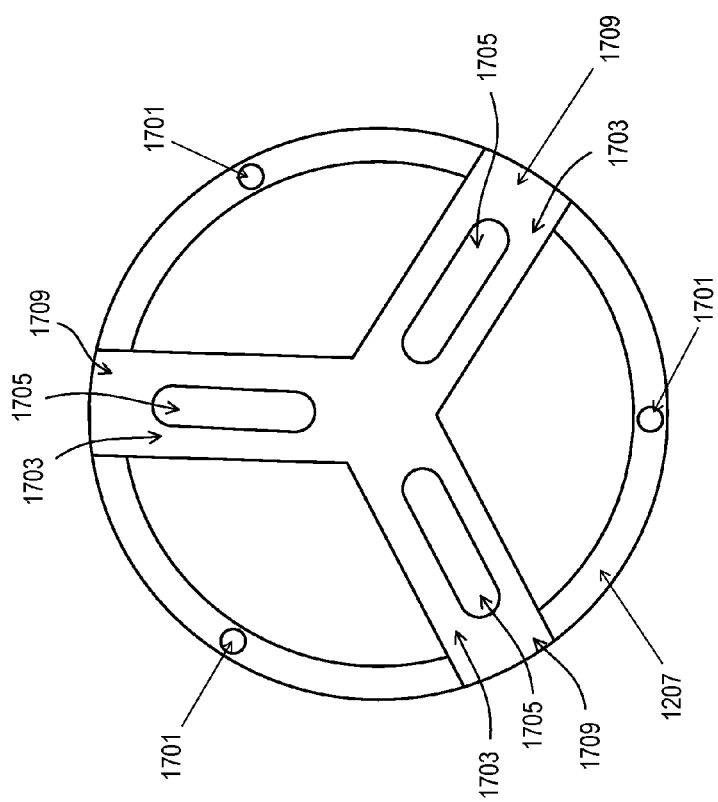
FIG. 17 is a top down view of the inside of the bottom cover of an alternative embodiment of a cup holder adapter.

FIG. 17 is a top down view of the inside of bottom cover 1207. The hollow inside cylindrical portion of Bottom cover 1207 fits over scroll plate 1201 and extending members 1205 and is secured to scroll plate 1201 with screws 1209 that pass through screw holes 1701 accessible from the flat opposing side of bottom cover 1207. When bottom cover 1207 is screwed into place over scroll plate 1201 and extending members 1205, extending members 1205 are each positioned to slide within a recessed guide track 1703 with rounded protrusions 1407 sliding in recessed protrusion track 1705. The travel distance of extending members 1205 is limited in either direction by the ends of recessed protrusion track 1705. Openings 1709 in the sidewall of bottom cover 1207 permit extending members 1205 to pass through the outside wall of bottom cover 1207 and contact the inside surface of a cup holder.

Figure 18:
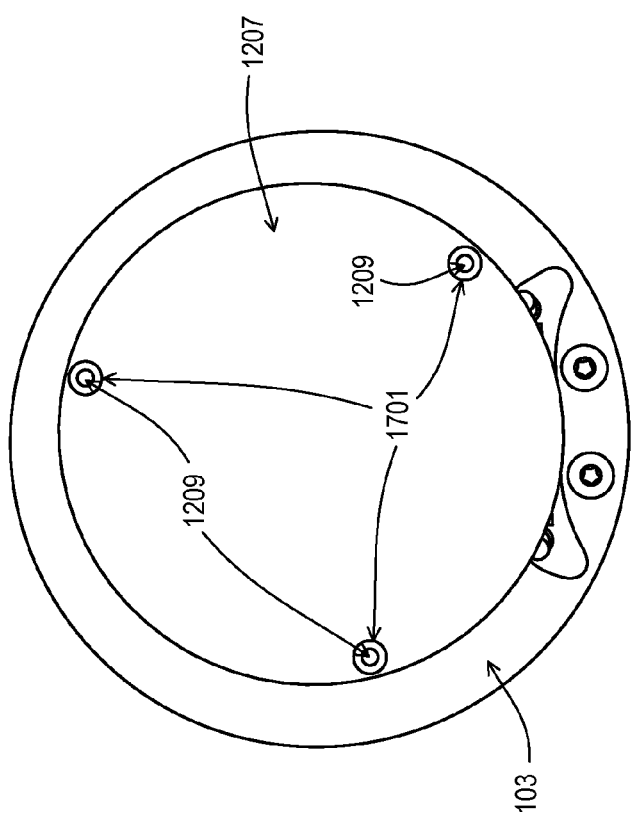
FIG. 18 is a top down view of an alternative embodiment of a cup holder adapter with the bottom cover in place and extending members retracted.
Figure 19:
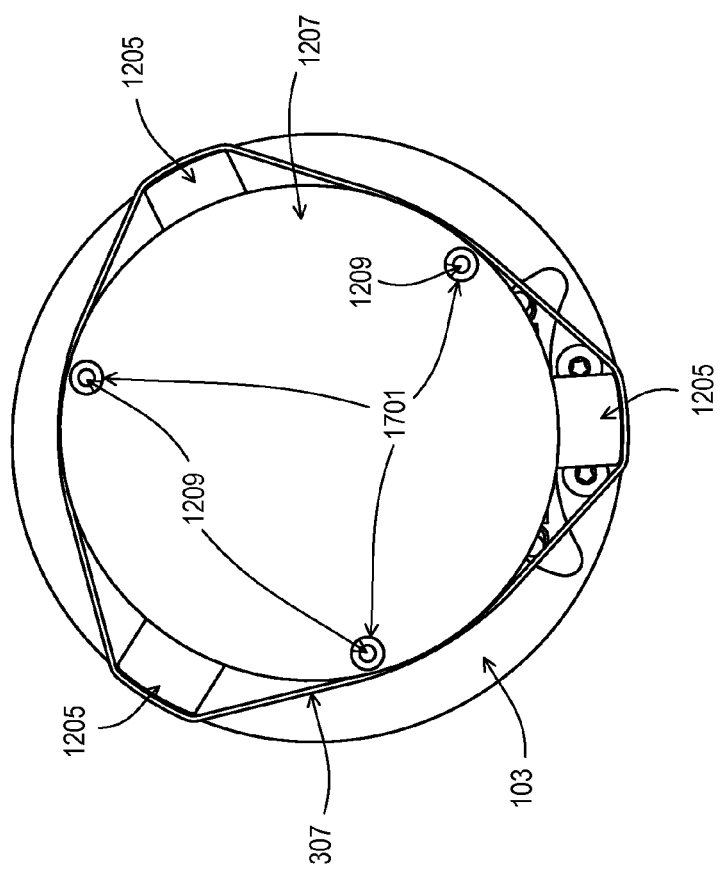
FIG. 19 is a top down view of an alternative embodiment of a cup holder adapter with the bottom cover in place and extending members extended.

FIG. 18 is a top down view of bottom cover 1207 with extending members 1205 retracted and not visible. Screws 1209 are visible in screw holes 1701 securing bottom cover 1207 to scroll plate 1201 and base 103. FIG. 19 is also a top down view of bottom cover 1207 with extending members 1205 extended and visible passing through openings 1709 in the cylindrical outside surface of bottom cover 1209, and pressing outwardly against rubber band 307.

Figure 20:
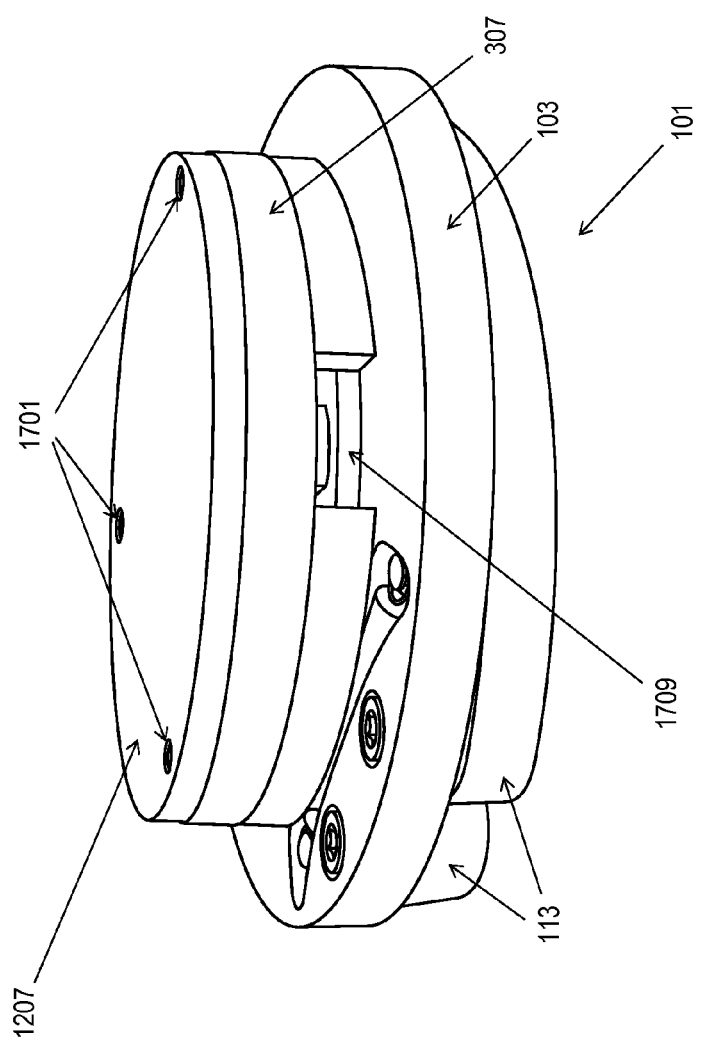
FIG. 20 is a side perspective view of an alternative embodiment of a cup holder adapter.

FIG. 20 is a side view of cup holder adapter 101 with bottom cover 1207 facing up. As can be seen in this view, the outside bottom surface of bottom cover 1207 is flat with screws 1209 (not shown) accessible through screw holes 1701. Opening 1709 in bottom cover 1207 permits extending member 1205 to pass through bottom cover 1207 and contact the inside surface of the cup holder. Rubber band 307 is stretched around bottom cover 1207 and the ends of extending members 1205 to bias extending members 1205 towards the center of scroll plate 1201 and to add a gripping surface between extending members 1205 and the inside surface of the cup holder.

Operation of this embodiment will now be described with reference to FIGS. 12-20. Cup holder adapter 101 starts out with extending members 1205 in a retracted position inside the periphery of scroll plate 1201. Cup holder adapter 101 is placed into a cup holder with bottom cover 1207 inside the cup holder space below the rim of the cup holder. The top of base 103 may be flush with the top of the cup holder or positioned above the rim of the cup holder. In either case, cup holder adapter 101 is then in position to be secured within the cup holder. As the user tightens adjustment screw 111 through the top of base 103, adjustment screw 111 causes scroll plate 1201 under base 103 to turn. As scroll plate 1201 turns, protrusions 1403 slide through channel 1305 defined by defined ridge 1301. This results in extending members 1205 being forced circumferentially outwardly. At the same time, rounded protrusions 1407 on the opposing side of extending members 1205 are engaged in recessed protrusion track 1705 and extending members 1205 move radially outward within recessed guide track 1703 passing through the exterior cylindrical wall of bottom cover 1207. Maximum extension is reached when rounded protrusions 1407 on extended members 1205 reach the end of recessed protrusion track 1705.

Rubber band 307 biases extending members 1205 towards the center of scrolling plate 1201 as extending members 1205 move in an outward direction. When the extending members 1205 make firm contact with the interior walls of the cup holder, the user may stop turning adjustment screw 111. Rubber band 307 positioned between the outside surface of extending members 1205 and the inside surface of cup holder adds a non-slip surface for better grip to keep cup holder adapter 101 in place. Once extending members 1205 are tightened into position within cup holder, cup holder adapter 101 is secure and ready to use for holding an object.

Once cup holder adapter 101 is securely in position within the cup holder, the components and operation of the cup holder positioned above base 103 and accessible to the user is the same as for that described above with respect to the embodiment in FIGS. 1-11.

The operation of expanding and retracting extending members 1205 of cup holder adapter 101 enables cup holder adapter 101 to be used in a great variety of cup holders having a host of different shapes, opening sizes and depths.

To remove cup holder adapter 101 from the cup holder, adjustment screw 111 is loosened. The loosening action causes scroll plate 1201 to turn in the opposite direction thereby causing protrusions 1403 on extending members 1205 to slide in channel 1305 and within recessed guide track 1703 back towards the center of scroll plate 1201. When extending members 1205 are fully retracted, they come together at notched ends 1405 and rubber band 307 returns to its unstretched position around the outside cylindrical surface of bottom cover 1207. Once adjustment screw 111 has been loosened enough for extending members 1205 to be retracted away from the inner surface of the cup holder, cup holder adapter 101 may be removed from its position within the cup holder.

It is to be understood that the above descriptions and drawings are only for illustrating representative variations of the present invention and are not intended to limit the scope thereof. Any variation and derivation from the above description and drawings are included in the scope of the present invention. For example, different adapters 107 can be configured to hold a multitude of different objects or even multiple objects at once. The base and the housing may be in shapes other than circular and may fit within cup holders or other openings that are configured in shapes other than circular. Different adapters 107 may be affixed to the top of base 103 in any number of ways including standardized tracks for engagement between the base 103 and a frame of adapter 107 or threaded screw holes and screws set up for alignment between base 103 and adapter 107.

What is claimed is:

1. An apparatus adapted to fit in a recessed opening comprising:
    a base having a first side and a second side;
    a rotatable plate positioned on the first side of the base and having a first side with a spiral-shaped ridge defining a continuous channel between inwardly spiraling portions of the ridge; and
    at least one extendable member having a first end and a second end, and positioned relative to the spiral-shaped ridge wherein at least one protrusion on a first side of the at least one extendable member engages the channel; and
    a housing having an open interior space within which the rotatable plate and the at least one extendable member are positioned, comprising:
        a first housing end fitted over the rotatable plate and the at least one extendable member, and attached to the first side of the base,
        a side having a gap aligned with each extendable member, and
        a solid cover over a second housing end having an interior surface completely covering and contacting a second side of the at least one extendable member;
    wherein as the plate is rotated in a first direction, the protrusion slides within the channel forcing the extendable member to move radially outward from a center of the plate while the interior surface of the solid cover maintains contact with the second side of the extendable member and extending through the gap in the side of the housing, and as the plate is rotated in a second direction, the protrusion slides within the channel forcing the extendable member to move radially inward from the center of the plate and retracting through the gap in the side of the housing while the interior surface of the solid cover maintains contact with the second side of the extendable member; and
    wherein upon the extendable member moving radially outward and passing through the gap in the side of the housing, the first end of the extendable member contacts an interior surface of the recessed opening maintaining the apparatus in position within the recessed opening.

2. The apparatus of claim 1 further comprising a frame attached to the second side of the base.

3. The apparatus of claim 2 wherein the frame is adjustable to extend beyond the periphery of the recessed opening.

4. The apparatus of claim 2 wherein the frame comprises at least one movable arcuate shaped arm biased toward a first position in the event that the at least one arcuate arm is moved to a second position.

5. The apparatus of claim 4 wherein the at least one movable arcuate shaped arm further comprises a recessed portion facing the second side of the base.

6. The apparatus of claim 1 wherein the frame further comprises an adapter having a semi-circular channel.

7. The apparatus of claim 6 wherein the semi-circular channel engages a substantially circular base portion of a piece of stemware such that the stemware is securely held in place in the adapter.

8. The apparatus of claim 1 further comprising an ash tray formed with a substantially circular protrusion from its base engages the adapter and securely holds the ash tray in place.

9. The apparatus of claim 1 where the adapter further comprises a base with a first side including an engagement element for engaging the adapter and a second side including a frame for holding an object.

10. The apparatus of claim 9 wherein the frame comprises at least one arcuate arm for exerting pressure against an object to maintain the object in position within the frame.

11. The apparatus of claim 9 wherein the frame is configured to hold one or more of: (a) an ashtray; (b) stemware; (c) a coffee mug; (d) a beverage container; (e) a lamp; (f) a music player; (g) a computing device; (h) a phone; (i) a tablet computer; (j) a vase; or (k) an electronic reader.

12. The apparatus of claim 1 further comprising:
    at least one slot in the interior surface of the cover aligned with the at least one gap in the side of the housing; and
    a second protrusion on a second side of the at least one extendable member that slidably engages with the at least one slot as the at least one extendable member moves.

13. An apparatus for securing an adapter in a recessed opening comprising:
    a base having a first side and a second side;
    a plate rotatably affixed to the first side of the base and having a first side with a spiral-shaped ridge defining a continuous channel between inwardly spiraling portions of the ridge; and
    at least one extending member having a first end and a second end, and with a protrusion on a first side of the at least one extendable member engaged in the channel;
    a housing having an open interior space within which the rotatable plate and the at least one extendable member are positioned, comprising:
    a first housing end fitted over the plate and the at least one extending member, and attached to the first side of the base,
    having a gap aligned with each extending member, and
    a solid cover over a second housing end having an interior surface completely covering and contacting a second side of the at least one extending member;
    wherein as the plate is rotated in a first direction, the protrusion slides within the channel forcing the extending member to move in a radially outward direction from the center of the plate while the interior surface of the solid cover maintains contact with the second side of the extendable member and extending through the gap in the side of the housing, and further wherein, as the plate is rotated in a second direction, the protrusion slides within the channel forcing the extending member to move in a radially inward direction from the center of the plate and retracting through the gap in the side of the housing while the interior surface of the solid cover maintains contact with the second side of the extendable member; and wherein upon the extending member moving radially outward, the first end of the extending member extends beyond a peripheral edge of the housing and contacts an interior surface of the recessed opening maintaining the apparatus in position within the recessed opening.

14. The apparatus of claim 13 further comprising a frame attached to the base for holding an object, wherein the frame is an ash tray formed with a substantially circular protrusions from its base such that the substantially circular protrusion is formed to engage the frame and securely hold the ashtray in place.

15. The apparatus of claim 13 further comprising a frame attached to the second side of the base.

16. The apparatus of claim 15 wherein the frame is adjustable to extend beyond the periphery of the recessed opening.

17. The apparatus of claim 15 wherein the frame further comprises a semi-circular channel.

18. The apparatus of claim 17 further comprising an ash tray formed with a substantially circular protrusion from its base that engages the semi-circular channel and securely holds the ash tray in place.

19. The apparatus of claim 13 further comprising:
at least one slot in the interior surface of the cover aligned with the at least one gap in the side of the housing; and
a second protrusion on a second side of the at least one extending member that slidably engages with the at least one slot as the at least extending member moves.

20. A method for fitting an adapter to a recessed opening, comprising:
providing a base having a first side and a second side;
positioning a rotatable plate relative to the base, wherein the rotatable plate comprises a first side with a spiral-shaped ridge defining a continuous channel between inwardly spiraling portions of the ridge;
providing at least one extendable member having a first end, a second end and at least one protrusion on a first side of the at least one extendable member, wherein the at least one protrusion is positioned relative to the spiral-shaped ridge and slidably engaged in the channel;
fitting a housing with a first end over the rotatable plate and the at least one extendable member;
attaching a first side of the housing to the base, the housing having at least one gap in a side of the housing for each extendable member;
covering the second end of the housing with a solid cover wherein a second side of the at least one extendable member is completely covered and contacted by an interior surface of the solid cover;
rotating the plate in a first direction wherein the at least one protrusion slides within the channel forcing the extendable member to move radially outward from a center of the plate while the interior surface of the solid cover completely covers and maintains contact with the second side of the extendable member and extending through the gap in the side of the housing such that the first end of the extendable member extends beyond a peripheral edge of the housing and contacts an interior surface of the recessed opening maintaining the apparatus in position within the recessed opening; and
rotating the plate in a second direction wherein the at least one protrusion slides within the channel forcing the extendable member to move radially inward from the center of the plate and retracting through the gap in the side of the housing while the interior surface of the solid cover completely covers and maintains contact with the second side of the extendable member.

21. The method of claim 20 further comprising attaching a frame to the second side of the base.

22. The method of claim 21 wherein the frame is adjustable to extend beyond the periphery of the recessed opening.

23. The method of claim 21 wherein the frame further comprises a semi-circular channel.

24. The method of claim 23 further comprising engaging an ash tray formed with a substantially circular protrusion from its base in the semi-circular channel.

* * * * *